(12) United States Patent
Jesurun (10) Patent No.: US 10,901,227 B2
(45) Date of Patent: Jan. 26, 2021

(54) REFRACTIVE LENS ARRAY ASSEMBLY

(71) Applicant: American Sterilizer Company, Mentor, OH (US)

(72) Inventor: David Jesurun, South Euclid, OH (US)

(73) Assignee: American Sterilizer Company, Mentor, OH (US)

(*) Notice: Subject to any disclaimer, the term of this patent is extended or adjusted under 35 U.S.C. 154(b) by 0 days.

(21) Appl. No.: 16/278,301

(22) Filed: Feb. 18, 2019

(65) Prior Publication Data
US 2019/0258068 A1 Aug. 22, 2019

Related U.S. Application Data

(60) Provisional application No. 62/633,320, filed on Feb. 21, 2018.

(51) Int. Cl.
*F21V 5/00* (2018.01)
*G02B 27/09* (2006.01)
*G02B 27/30* (2006.01)

(52) U.S. Cl.
CPC .......... *G02B 27/0961* (2013.01); *F21V 5/008* (2013.01); *G02B 27/30* (2013.01)

(58) Field of Classification Search
CPC .... F21V 5/008; G02B 27/0961; G02B 3/0062
See application file for complete search history.

(56) References Cited

U.S. PATENT DOCUMENTS

| | | |
|---|---|---|
| 1,941,079 A | 12/1933 | Exelmans |
| 3,305,294 A | 2/1967 | Alvarez |
| 3,583,790 A | 6/1971 | Baker |
| 4,457,592 A | 7/1984 | Baker |
| 4,925,281 A | 5/1990 | Baker |
| 5,666,564 A | 9/1997 | Albrecht |
| 5,775,799 A | 7/1998 | Forkner |
| 7,648,256 B2 | 1/2010 | Shiratsuchi et al. |
| 7,866,868 B2 | 1/2011 | Shiau et al. |
| 8,079,734 B2 | 12/2011 | Hou |
| 8,177,377 B2 | 5/2012 | Chang |
| 8,931,939 B2 | 1/2015 | Melzner et al. |
| 9,238,577 B2 | 1/2016 | Suleski et al. |
| 9,261,702 B2 | 2/2016 | Chan |
| 9,335,446 B2 | 5/2016 | Crosby et al. |
| 9,470,405 B2 | 10/2016 | Boccoleri et al. |
| 9,784,902 B2 | 10/2017 | Johnson et al. |
| 2004/0042085 A1 | 3/2004 | Hough |
| 2007/0025680 A1 | 2/2007 | Winston et al. |
| 2017/0292682 A1 | 10/2017 | Sepkhanov |
| 2019/0368690 A1* | 12/2019 | Goldstein .......... G02B 27/0927 |

* cited by examiner

*Primary Examiner* — Sean P Gramling
(74) *Attorney, Agent, or Firm* — Kusner & Jaffe (57) ABSTRACT

A refractive lens array assembly for integrated, adjustable beam spreading and bending, said refractive lens array comprising: (i) a first optical element including a top face having a stepped surface or a generally planar wedge-shaped surface, and a bottom face having a curved surface; and (ii) a second optical element including a top face having a curved surface, and a bottom face having a stepped surface or a generally planar wedge-shaped surface.

10 Claims, 8 Drawing Sheets

REFRACTIVE LENS ARRAY ASSEMBLY

RELATED APPLICATIONS

This application claims the benefit of U.S. Provisional Application No. 62/633,320 filed Feb. 21, 2018, which is hereby fully incorporated herein by reference.

FIELD OF THE INVENTION

The present invention relates generally to optical elements and the like, and more particularly to a refractive lens array assembly for integrated, adjustable beam spreading and bending.

BACKGROUND OF THE INVENTION

Lenses for adjustable spreading (focusing) light beams and lenses for bending (aiming) light beams are known in the prior art. U.S. Pat. No. 3,305,394 to Alvarez (issued Feb. 21, 1967) teaches a lens assembly comprised of two refractive lens elements with adjustable optical power. Optical power is adjusted by moving a first lens element relative to a second lens element in a direction transverse to the optical axis of the lens assembly. This concept is applied to ophthalmic lenses used in eyeglasses for correction of presbyopia (i.e., diminished ability to focus clearly on close objects).

Figure 1A:
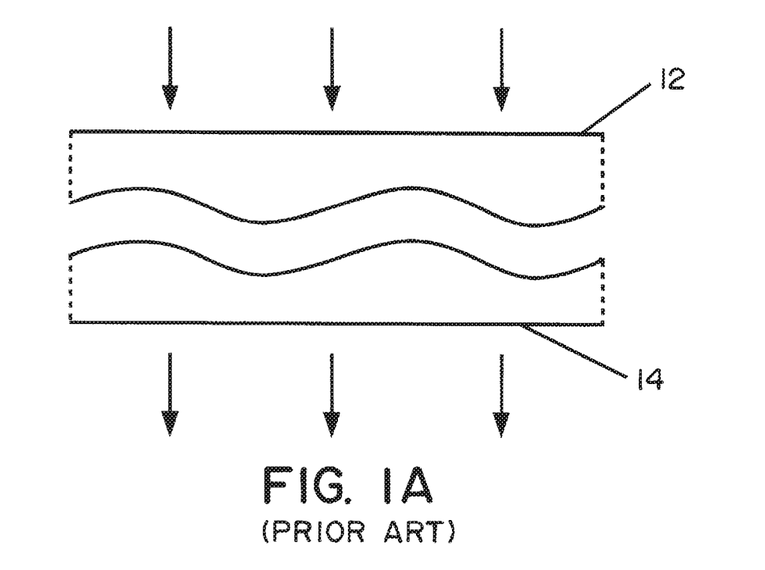
FIGS. 1A and 1B illustrate lens assembly configurations for beam spreading as disclosed in U.S. Pat. No. 3,305,394 to Alvarez and U.S. Pat. No. 5,775,799 to Forkner.
Figure 1B:
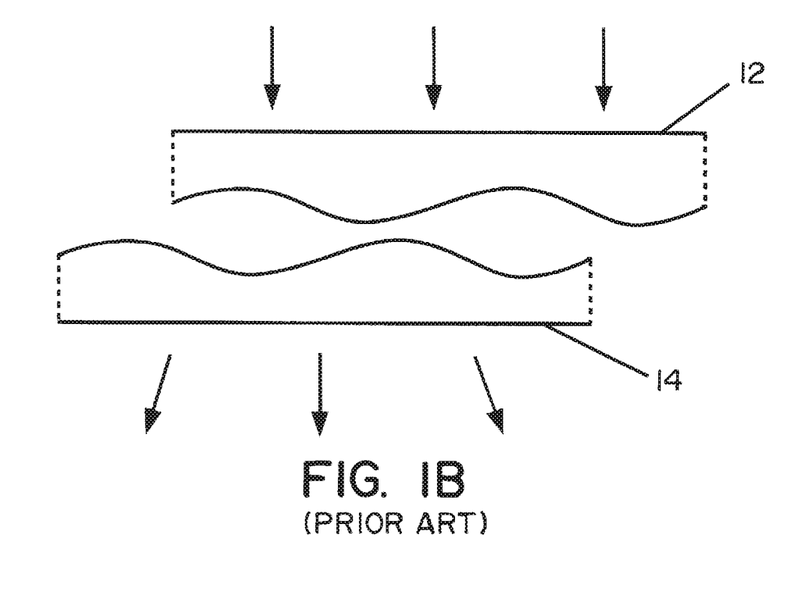

U.S. Pat. No. 5,775,799 to Forkner (issued Jul. 7, 1998) teaches a zoomable beam spreader comprised of two lenses, each lens having an array of alternating positive and negative lens segments that are aligned one behind the other along the optical axis. When one lens is moved relative to the other in a direction perpendicular to the optical axis, the spread of the beam is adjusted. Forkner teaches that the beam spreading occurs without substantially altering the direction of the beam. FIG. 1A illustrates the pair of lenses 12, 14 aligned in a neutral position (i.e., no-spread, focused), while FIG. 1B illustrates the pair of lenses 12, 14 aligned in a beam spread position after relative movement in a direction perpendicular to the optical axis.

Figure 2:
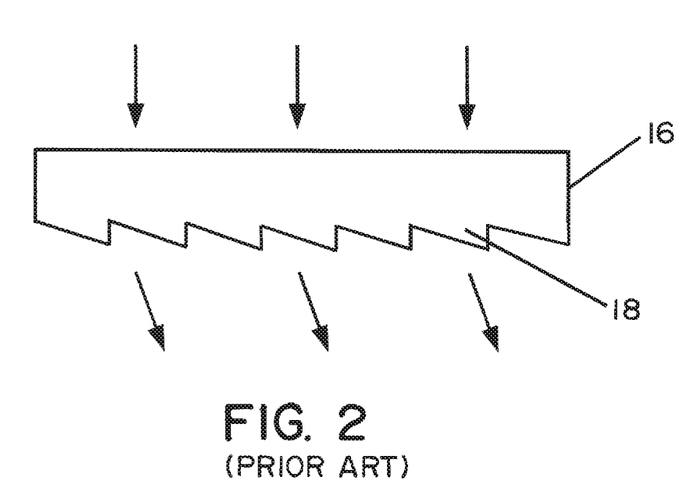
FIG. 2 illustrates beam bending using a single optical element as disclosed in U.S. Pat. No. 9,470,405 to Boccoleri.

U.S. Pat. No. 9,470,405 to Boccoleri teaches a surgical light assembly with beam redirecting optics. The light assembly comprises a housing, a substrate, at least one first optical element and at least one second optical element. The substrate is positioned within the housing, with the substrate having a substantially planar top surface with a plurality of LEDs on the substantially planar top surface. Each of the LEDs emit light when activated. The at least one first optical element is positioned adjacent the LEDs and has a first entrance and a first exit. The at least one first optical element receives the light emitted from the LEDs into the first entrance and passes the light therethrough. The light exiting the at least one first optical element at the first exit is collimated and substantially perpendicular to the substantially planar top surface of the substrate. The at least one second optical element is positioned adjacent the first exit of the first optical element. The at least one second optical element has a second entrance receiving the light exiting the first optical element. The light exits the at least one second optical element through a second exit of the at least one second optical element and is focused or redirected to an area at a desired distance from the second exit of the at least one second optical element. In a preferred embodiment, the at least one second optical element includes an array of fixed Fresnel wedges (or other light directing lens) for bending the beams produced by the LEDs and collimators to form a composite beam by overlapping these individual beams at a desired distance. Boccoleri's apparatus is based on the fundamental optical principle of refraction, as illustrated by lens 16 shown in FIG. 2. Lens 16 includes a lower surface having an array of Fresnel wedges 18 formed therein. Boccoleri also teaches the use of a stack of alternating positive and negative lenses to adjustably focus a beam of collimated light.

In accordance with prior art apparatus, separate optical elements are stacked along the optical axis (i.e., two for adjustable beam spreading and one for bending) to effect both spreading and bending of individual light beams in the same lighting system. However, this configuration increases the complexity of the design and assembly of the lighting system, resulting in increased size, and increased manufacturing costs.

The present invention overcomes these and other drawbacks in the prior art by providing a refractive lens array for integrated, adjustable beam spreading and bending.

SUMMARY OF THE INVENTION

In accordance with a first aspect of the present invention, there is provided a lighting system comprising: a light source; a collimator; and a refractive lens array assembly. The refractive lens array assembly comprises: a first optical element including a first face having a stepped surface and a second face having a curved surface, and a second optical element including a first face having a curved surface and a second face having a generally planar wedge-shaped surface, the second face of the first optical element facing the first face of the second optical element, wherein at least one of the first optical element and the second optical element is moveable relative to an optical axis.

In accordance with a second aspect of the present invention, there is provided a lighting system comprising: a light source; a collimator; and a refractive lens array assembly. The refractive lens array assembly comprises a first optical element including a first face having a generally planar wedge-shaped surface and a second face having a curved surface, and a second optical element including a first face having a curved surface and a second face having a stepped surface, the second face of the first optical element facing the first face of the second optical element, wherein at least one of the first optical element and the second optical element is moveable relative to an optical axis.

In accordance with a third aspect of the present invention, there is provided a lighting system comprising: a light source; a collimator; and a refractive lens array assembly comprising: a first optical element including a first face having a stepped surface and a second face having a curved surface, a second optical element including a first face having a curved surface and a second face having a generally planar surface, and a third optical element including a first face having a generally planar surface and a second face having a generally planar wedge-shaped surface, wherein the curved surfaces of the first and second optical elements face each other and the generally planar surfaces of the second and third optical elements face each other, and wherein at least one of the first optical element, the second optical element, and the third optical element is moveable relative to an optical axis.

In accordance with a fourth aspect of the present invention, there is provided a lighting system comprising: a light source; a collimator; and a refractive lens array assembly. The refractive lens array assembly comprises a first optical element including a first face having a generally planar wedge-shape surface and a second face having a curved surface, a second optical element having a first face having a curved surface and a second face having a generally planar surface, and a third optical element having a first face having a generally planar surface and a second face having a stepped surface, wherein the curved surfaces of the first and second optical elements face each other and the generally planar surfaces of the second and third optical elements face each other, and wherein at least one of the first optical element, the second optical element, and the third optical element is moveable relative to an optical axis.

An advantage of the present invention is the provision of a refractive lens array assembly that combines bending (aiming) and spreading (focusing) functionality into fewer individual optical elements.

Another advantage of the present invention is the provision of a refractive lens array assembly for integrated, adjustable beam spreading and bending that combines beam spreading and bending functionality into fewer optical elements by using each surface of an optical element for a separate purpose.

Another advantage of the present invention is the provision of a refractive lens array assembly that allows the use of counter-rotating wedge-shaped optical elements to adjustably aim individual light beams, and thereby adjust the distance from the light source at which a composite beam is optimally formed.

Another advantage of the present invention is the provision of a refractive lens array assembly that provides higher energy efficiency by reducing the number of air/plastic interfaces located between optical elements.

Still another advantage of the present invention is the provision of a refractive lens array assembly that provides lower manufacturing costs due to the use of fewer components.

Still another advantage of the present invention is the provision of a refractive lens array assembly that has reduced complexity due to the reduction in the number of components that require accurate alignment.

Still another advantage of the present invention is the provision of a refractive lens array assembly that allows for decreased size by reducing the optical path length.

Still another advantage of the present invention is the provision of a refractive lens array assembly that uses optical means, rather than mechanical means, for aiming light beams.

Still another advantage of the present invention is the provision of a refractive lens array assembly that avoids the design effort, production costs, and assembly complexity associated with the use of existing mechanical means to aim light beams.

Yet another advantage of the present invention is the provision of a refractive lens array assembly that allows individual beams of light to be initially aimed straight ahead, rather than precisely aimed mechanically, thereby simplifying the mounting of lighting sources (e.g., LEDs) and associated circuit boards to a lighting system housing.

Yet another advantage of the present invention is the provision of a refractive lens array assembly that provides improved reliability for adjustable aim, since it is easier to adjust the position of small optical components than it is to move light sources and their associated mounting and electrical hardware while maintaining effective cooling of a housing assembly for a lighting system.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, embodiments of which will be described in detail in the specification and illustrated in the accompanying drawings which form a part hereof, and wherein.

DETAILED DESCRIPTION OF THE INVENTION

Figure 3A:
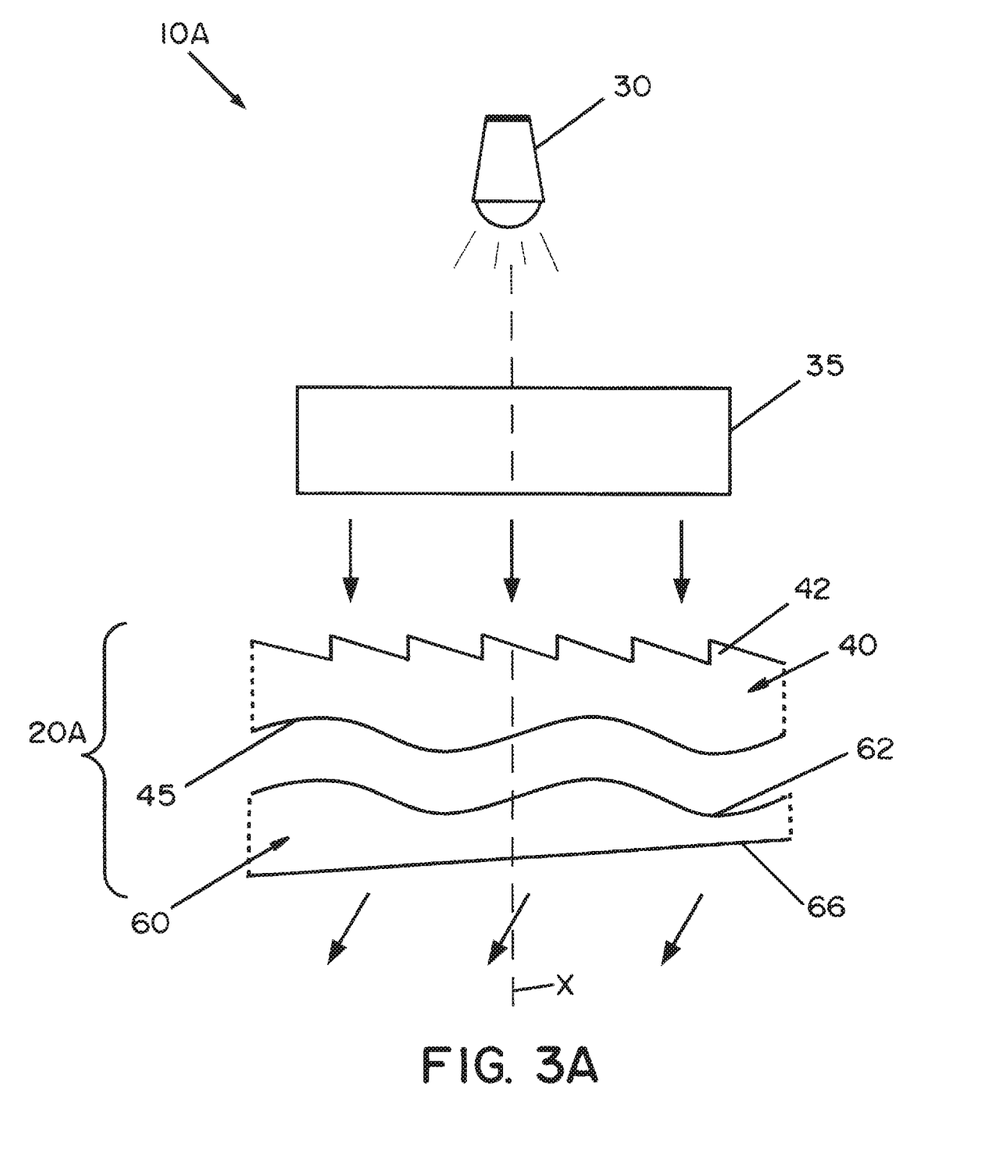
FIGS. 3A and 3B illustrate a refractive lens array assembly according to a first embodiment of the present invention that provides integrated, adjustable beam spreading and bending.
Figure 3B:
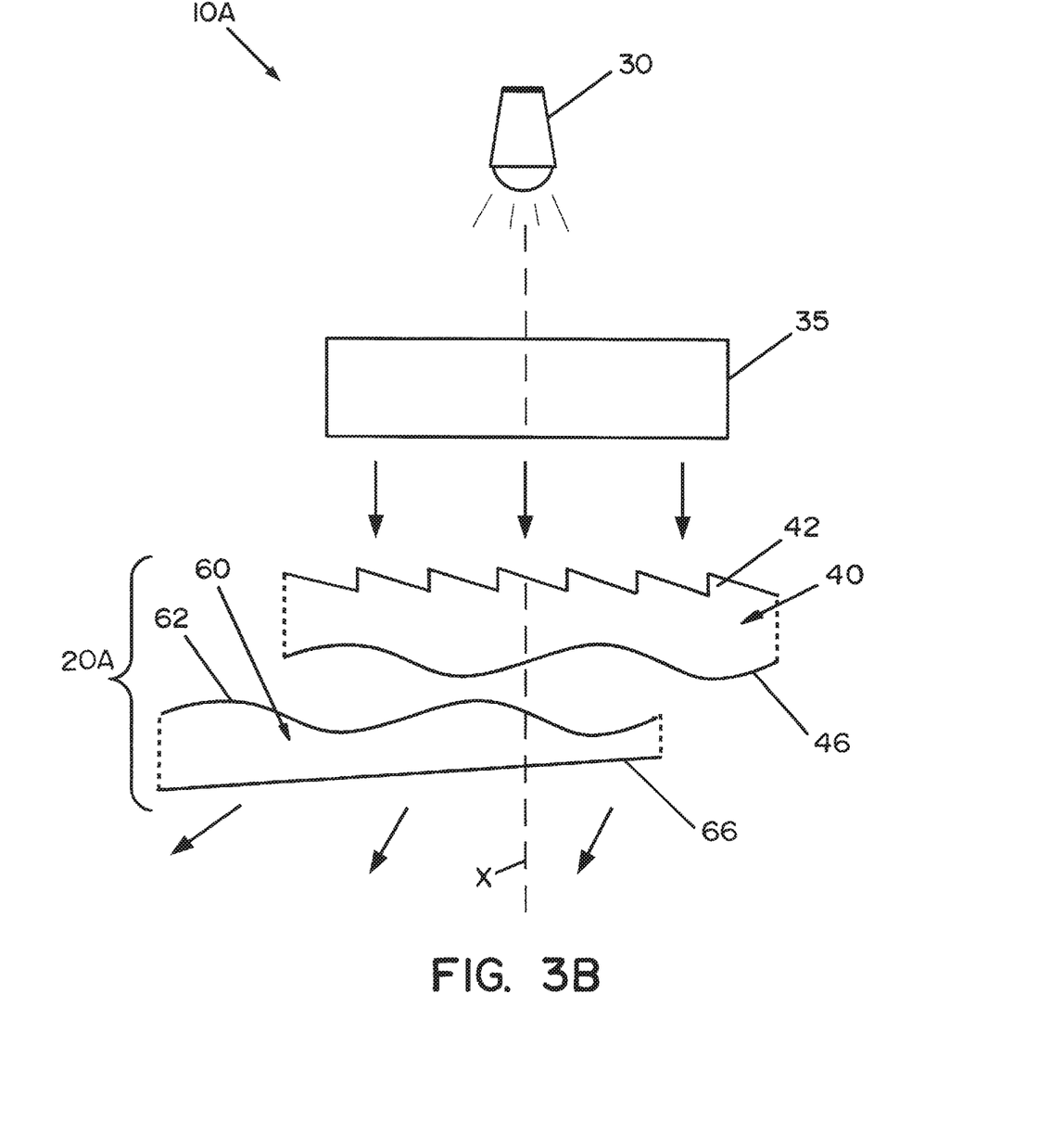

Referring now to the drawings wherein the showings are for the purposes of illustrating an embodiment of the invention only and not for the purposes of limiting same, FIGS. 3A and 3B show a lighting system 10A that is generally comprised of a light source 30, a collimator 35, and a refractive lens array assembly 20A according to a first embodiment of the present invention. Light source 30 may take the form of an LED or other lighting element. Collimator 35 collects and directs the light received from light source 30 into a narrow beam to provide a collimated light beam that is received by assembly 20A. For example, collimator 35 may take the form of a total internal reflection (TIR) optical element.

Refractive lens array assembly 20A is comprised of a first optical element 40 (inner wavelense) having a top face 42 and a bottom face 46, and a second optical element 60 (outer wavelense) having a top face 62 and a bottom face 66. First and second optical elements 40, 60 collectively form a lens stack.

Top face 42 of first optical element 40 has a stepped surface (e.g., an array of Fresnel wedges). The stepped surface bends individual portions of the light beam. Bottom face 44 of first optical element 40 has a curved (or wave) surface. Top face 62 of second optical element 60 has a curved (or wave) surface, and bottom face 66 of second optical element 60 has a generally planar wedge-shaped surface.

The curved (or wave) surface may take the form of an array of surface peaks and valleys. A generally planar wedge-shaped surface refers to a generally planar surface that is not perpendicular to the direction of travel of the light beam (i.e., optical axis "X"). It should be appreciated that the curved surface of bottom face 46 of first optical element 40 and the curved surface of top face 62 of second optical element 60 may be defined according to a lens equation, or simply take the form of a "free form" curved surface. A "free form" curved surface may provide the same or substantially the same optical effect as a curved surface defined by a lens equation.

Collimator 35, first optical element 40, and second optical element 60 may be made of optical glass, transparent plastic, or any other material suitable for the manufacture of lenses.

In accordance with the present invention, a control unit (not shown) may be used to effect movement of optical elements 40, 60. Accordingly, optical element 40 and/or optical element 60 may move in relation to optical axis X. For example, optical element 40 and/or optical element 60 may be mechanically configured to move linearly or rotationally.

In FIG. 3A, first and second optical elements 40, 60 are aligned in a neutral orientation, wherein there is no spreading of the light beam exiting assembly 20A. In FIG. 3B, first optical element 40 and second optical element 60 move in opposite directions in relation to optical axis X, thereby aligning in an offset orientation to spread the light beam exiting assembly 20A.

In accordance with the illustrated embodiment of the present invention, light beam spreading (i.e., focus) may be adjusted by relative movement of first optical element 40 and/or second optical element 60. Bending (aiming) of the light beam exiting assembly 20A may be modified at different locations by using Fresnel wedges of different angles as the surface of top face 42 of first optical element 40.

As indicated above, the contour of the bottom surface of first optical element 40 is curved. This allows the introduction of some optical power, so that the light beam transmitted through first optical element 40 is not only bent, but also diverges or converges, as it passes through first optical element 40.

In the illustrated embodiment of the present invention described above with reference to FIGS. 3A and 3B, top face 42 of first optical element 40 has a stepped surface and bottom face 66 of second optical element 60 has a generally planar wedge-shaped surface. However, it should be appreciated that the optical concept of the present invention may also be implemented using alternative configurations for the surfaces of top faces 42, 62 and bottom faces 46, 66 of first and second optical elements 40, 60. For example, top face 42 of first optical element 40 may alternatively have a generally planar wedge-shape surface, and bottom face 66 of second optical element 60 may alternatively have a stepped surface, such as an array of Fresnel wedges. It should be noted that a generally planar wedge-shaped surface provides a surface that is easier to clean, and therefore, may be beneficial as an outer surface of assembly 20A as used in a surgical lighthead assembly.

Figure 4:
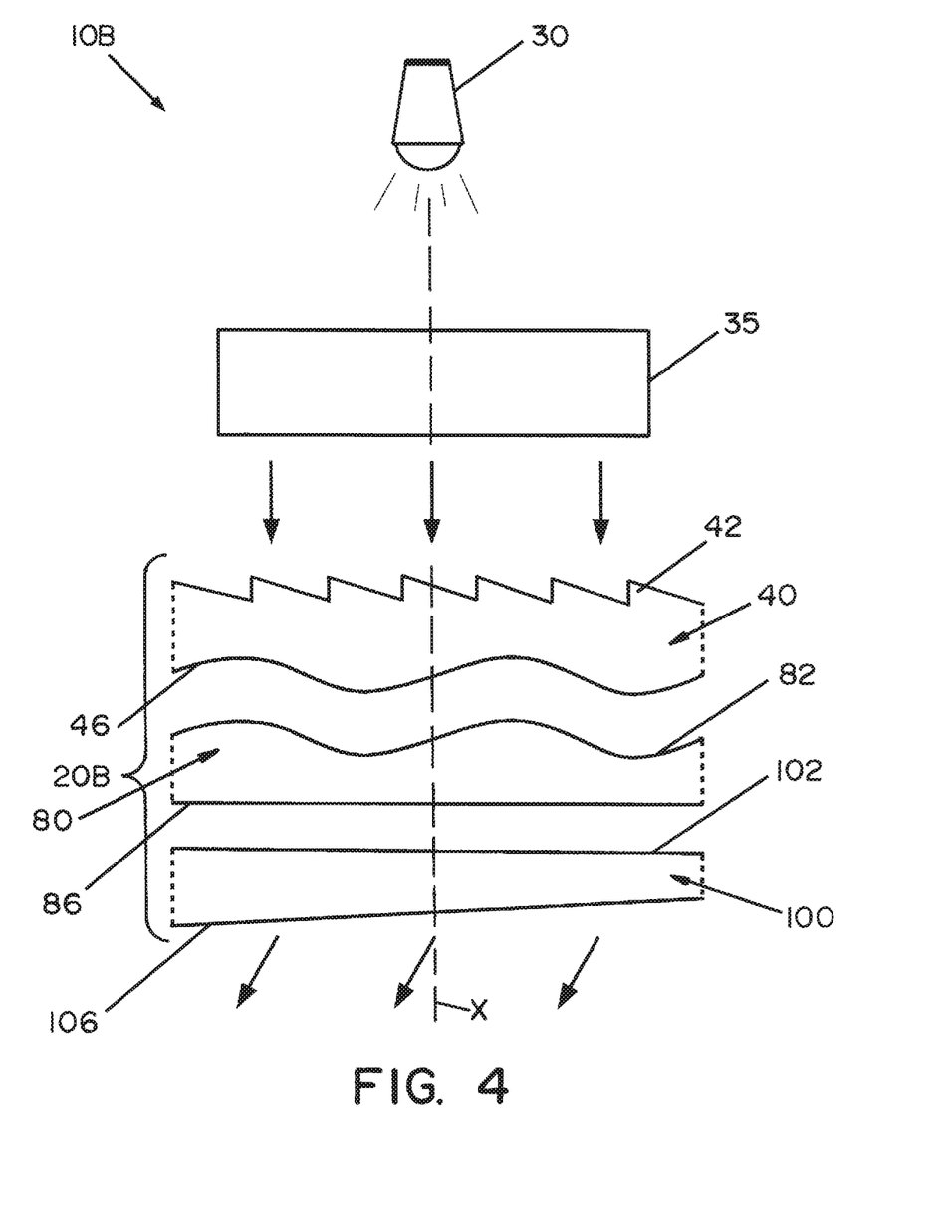
FIG. 4 illustrates a refractive lens array assembly according to a second embodiment of the present invention that provides independently adjustable light beam spreading and bending.

According to an alternative embodiment of the present invention, the refractive lens array assembly is modified to include an additional optical element, thereby enabling adjustable aiming of the light beam. Referring now to FIG. 4, there is shown a lighting system 10B having a refractive lens array assembly 20B according to a second embodiment of the present invention. Assembly 20B is generally comprised of first optical element 40 (inner wavelense) as described above, a second optical element 80 (middle wavelense), and a third optical element 100 (outer wavelense). First, second, and third optical elements 40, 80, and 100 collectively form a lens stack.

Second optical element 80 includes a top face 82 having a curved (or wave) surface and a bottom face 86 having a generally planar surface. Third optical element 100 takes the form of a wedge-shaped lens including a top face 102 having a generally planar surface and a bottom face 106 having a generally planar wedge-shaped surface. The surface of top face 102 of third optical element 100 and the surface of bottom face 86 of second optical element 80 are substantially parallel to each other. Spreading (focusing) and bending (aiming) of the light beam is adjustable by independently moving (e.g., by rotational or linear motion) two of the optical elements of assembly 20B relative to the third optical element of assembly 20B, which is fixed.

In accordance with an alternative embodiment of the present invention, it is contemplated that the surfaces of top face 42 and bottom face 106 may be reversed. In this regard, top face 42 of first optical element 40 alternatively has a generally planar wedge-shape surface, while bottom face 106 of third optical element 100 alternatively has a stepped surface, such as an array of Fresnel wedges.

Figure 5:
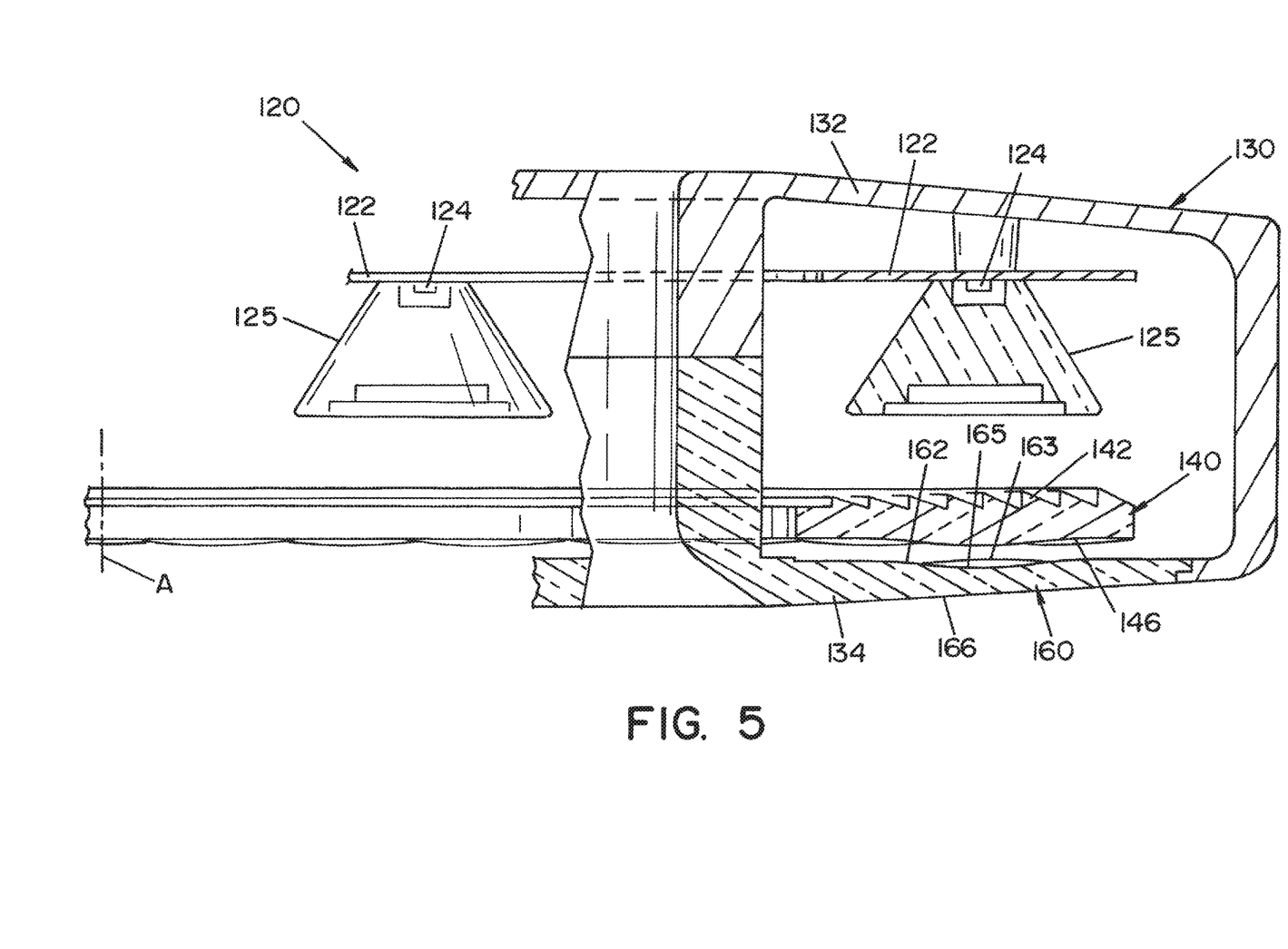
FIG. 5 illustrates a portion of a surgical lighthead assembly that includes a refractive lens array assembly having a rotatable first optical element and a fixed second optical element, according to an embodiment of the present invention, wherein the rotatable first optical element is in a first position relative to the second optical element.
Figure 6:
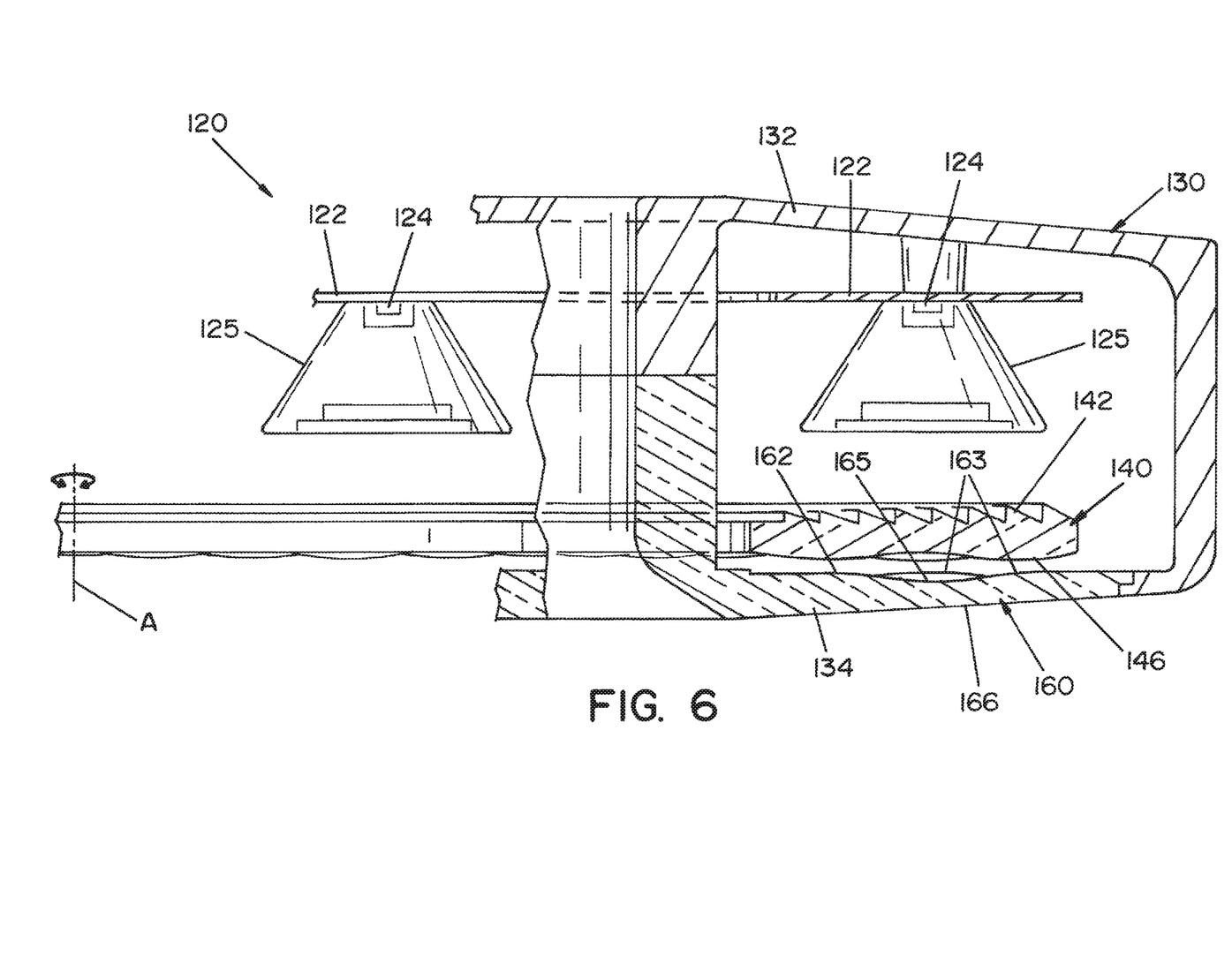
FIG. 6 illustrates the portion of the surgical lighthead assembly shown in FIG. 5, wherein the rotatable first optical element is in a second position relative to the second optical element.
Figure 7:
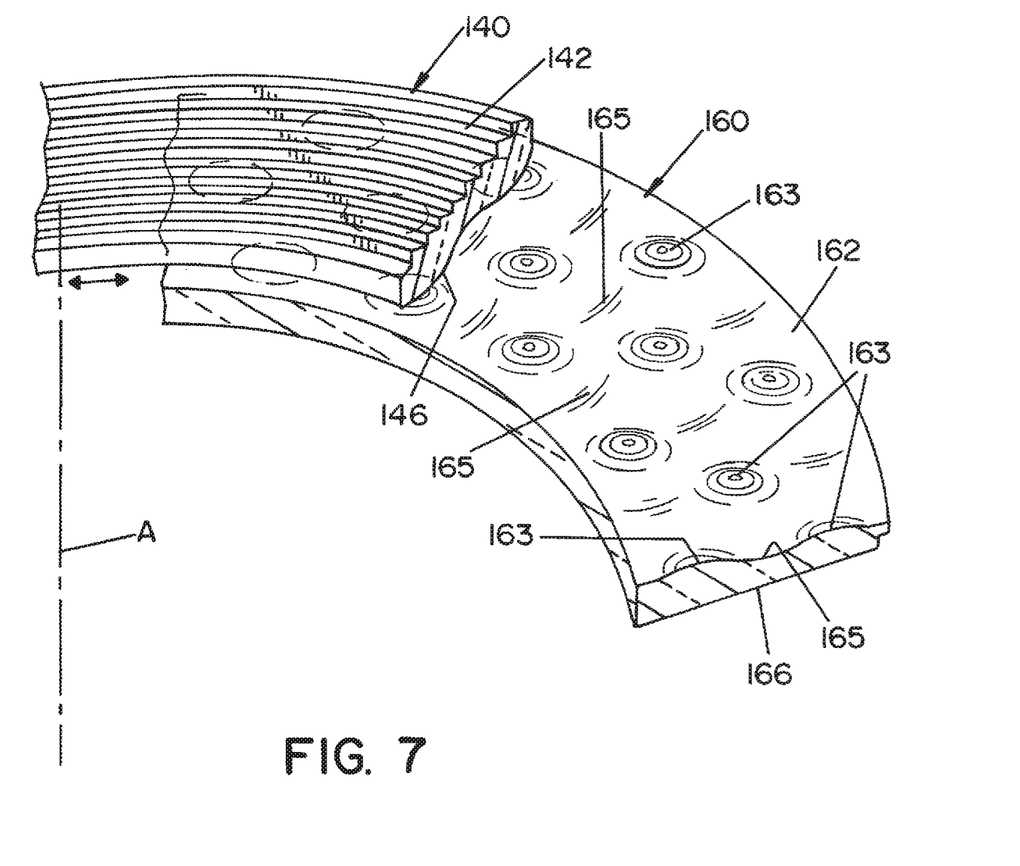
FIG. 7 illustrates the first and second optical elements of FIGS. 5 and 6, with other components removed for greater clarity.

Referring now to FIGS. 5-7, a refractive lens array assembly according to an embodiment of the present invention will be described in connection with a surgical lighthead assembly 120. Lighthead assembly 120 is generally comprised of a circuit board 122, a plurality of light sources 124 (e.g., LEDs) mounted to circuit board 122, a plurality of collimators 125, a housing 130 having an upper housing section 132 and a lower housing section 134. The refractive lens array assembly is comprised of a ring-shaped first optical element 140 (inner wavelense) having a top face 142 and a bottom face 146, and a ring-shaped second optical element 160 (outer wavelense) having a top face 162 and a bottom face 166. In the illustrated embodiment second optical element 160 forms at least a portion of lower housing section 134. In the illustrated embodiment, top face 142 and bottom face 146 of first optical element 140 respectively have the same surfaces as top face 42 and bottom face 46 of first optical element 40, described in detail above. Likewise, top face 162 and bottom face 166 of second optical element 160 respectively have the same surfaces as top face 62 and bottom face 66 of second optical element 60, described in detail above. As best seen in FIG. 7, the surface of top face 162 of second optical element 160 includes an array of surface peaks 163 and valleys 165. Likewise, the surface of bottom face 146 of first optical element 140 includes an array of similar surface peaks and valleys.

In the embodiment illustrated in FIGS. 5-7, first optical element 140 and second optical element 160 are generally ring-shaped, as best seen in FIG. 7. Second optical element 160 is fixed relative to first optical element 140 since it forms a portion of lower housing section 134. first optical element 140 is rotatable about axis A, thereby providing movement of first optical element 140 relative to second optical element 160. Rotation of first optical element 140 changes the locations of the peaks and valleys of the lower surface of first optical element 140 relative to the locations of the peaks and valleys of the upper surface of second optical element 160 in a manner similar to the movement of first optical element 42 relative to second optical element 62, as illustrated by FIGS. 3A and 3B. The peaks and valleys on the surfaces of bottom face 146 and top face 162 are formed according to a selected amplitude and period.

In FIG. 5, first and second optical elements 140, 160 are aligned in a neutral orientation, wherein there is no spreading of the light beam exiting lighthead 120. In FIG. 6, first optical element 140 is rotated relative to fixed second optical element 160, thereby aligning in an offset orientation to spread the light beam exiting lighthead 120.

A control unit (not shown) is connected to circuit board 122 for controlling light sources 124. Furthermore, a handle or drive member (e.g., electrical motor), not shown, are provided to facilitate rotation of first optical element 140.

It should be appreciated that first optical element 140 and second optical element 160 may take forms other than ring-shaped. In this respect, at least one of the optical elements 140 and 160 may be disc-shaped, or another geometric shape.

In the embodiment shown in FIGS. 5-7, the present invention is implemented as an element of a surgical lighthead assembly comprised of one or more substantially collimated light sources, a lens stack comprised of two optical elements for simultaneously spreading (focusing) and bending (aiming) the light beam, wherein the entrance and exit surfaces of at least one of the optical elements is adapted to allow a single optical element to both spread and bend a light beam (i.e., a single optical component that combines spreading and bending functionality); and means for effecting movement of one or more optical elements relative to other optical elements in order to provide adjustable spreading and/or bending of the light beam.

It should be appreciated by one skilled in the art that the concept of the integrated beam spreading and bending according to the present invention may also be practiced with light sources other than LEDs and TIR collimators. Furthermore, it is contemplated by the inventors that the concepts described herein directed to an integrated, adjustable beam focusing and aiming apparatus can be applied to a wide variety of lighting devices, including, but not limited to, surgical lighting apparatus, automotive forward lighting, theater lighting, display lighting, and the like.

According to an alternative embodiment of the present invention, the bending (aiming) of a light beam passing through a refractive lens array assembly may be adjusted by rotating a first optical element (which has a surface formed of a plurality of Fresnel wedges) around an optical axis of the refractive lens array assembly. As a result, the distance from the lighting apparatus at which a composite beam is optimally formed is adjusted. This approach to light beam bending is based on the concept of Risley prism based beam steering.

It should be appreciated that multiple alternative embodiments of the present invention are contemplated depending upon which surfaces of the refractive lens array assembly are chosen for spreading and bending the light beam. Furthermore, it is contemplated that the refractive lens array assembly of the present invention may include a greater number of optical elements than as shown in the illustrated embodiments. For example, one or more additional optical elements similar to the wedge-shaped third optical element 100 described above may be included in a refractive lens array assembly according to an alternative embodiment of the present invention.

Furthermore, it is contemplated that the present invention may also include means for performing compound motion of optical elements to independently control adjustable spreading and bending of the light beam. For example, rotation of one wedge-shaped optical element relative to another wedge-shaped optical element steers the light beam in a circle, whereas the counter-rotation of the two wedge-shaped optical elements steers the light beam along a straight line, although the amount of steering depends in a non-linear manner on the amount of rotation of the optical elements.

The foregoing describes specific embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A lighting system comprising:
   a light source;
   a collimator; and
   a refractive lens array assembly comprising:
      a first optical element including a first face having a stepped surface, and a second face having a curved surface, and
      a second optical element including a first face having a curved surface, and a second face having a generally planar wedge-shaped surface, the second face of the first optical element facing the first face of the second optical element,
      wherein at least one of the first optical element and the second optical element is moveable relative to an optical axis.

2. The lighting system of claim 1, wherein said curved surfaces of the first and second optical elements are comprised of an array of surface peaks and valleys.

3. The lighting system of claim 1, wherein said stepped surface of the first optical element is comprised of a plurality of Fresnel wedges.

4. The lighting system of claim 1, wherein at least one of said first and second optical elements is ring-shaped or disc-shaped.

5. The lighting system of claim 1, wherein at least one of said first and second optical elements is rotatable about an axis or movable linearly.

6. A lighting system comprising:
   a light source;
   a collimator; and
   a refractive lens array assembly comprising:
      a first optical element including a first face having a generally planar wedge-shaped surface, and a second face having a curved surface, and
      a second optical element including a first face having a curved surface, and a second face having a stepped surface, the second face of the first optical element facing the first face of the second optical element,
      wherein at least one of the first optical element and the second optical element is moveable relative to an optical axis.

7. The lighting system of claim 6, wherein said curved surfaces of the first and second optical elements are comprised of an array of surface peaks and valleys.

8. The lighting system of claim 6, wherein said stepped surface of the second optical element is comprised of a plurality of Fresnel wedges.

9. The lighting system of claim 6, wherein at least one of said first and second optical elements are ring-shaped or disc-shaped.

10. The lighting system of claim 6, wherein at least one of said first and second optical elements is rotatable about an axis or movable linearly.

\* \* \* \* \*